(12) United States Patent
Sheha et al.

(10) Patent No.: US 8,019,581 B2
(45) Date of Patent: Sep. 13, 2011

(54) SYSTEM AND METHOD FOR PROVIDING ROUTING, MAPPING, AND RELATIVE POSITION INFORMATION TO USERS OF A COMMUNICATION NETWORK

(75) Inventors: Michael A. Sheha, Laguna Niguel, CA (US); Stephen Petilli, Laguna Niguel, CA (US); Angie Sheha, Laguna Niguel, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 11/968,635

(22) Filed: Jan. 2, 2008

(65) Prior Publication Data
US 2008/0188246 A1 Aug. 7, 2008

Related U.S. Application Data

(62) Division of application No. 10/194,518, filed on Jul. 11, 2002, now Pat. No. 7,333,820.

(60) Provisional application No. 60/305,975, filed on Jul. 17, 2001.

(51) Int. Cl.
*G06G 7/48* (2006.01)
*H04W 24/00* (2009.01)
*G01C 21/00* (2006.01)

(52) U.S. Cl. ............. 703/8; 701/200; 701/201; 455/457

(58) Field of Classification Search .................. 703/6, 8, 703/13; 701/23, 24, 25, 28, 200, 201, 209, 701/213; 455/457
See application file for complete search history.

(56) References Cited

U.S. PATENT DOCUMENTS

| | | | |
|---|---|---|---|
| 4,939,662 A | 7/1990 | Nimura et al. |
| 5,389,934 A | 2/1995 | Kass |
| 5,557,254 A | 9/1996 | Johnson |
| 5,636,122 A | 6/1997 | Shah |
| 5,689,269 A | 11/1997 | Norris |
| 5,689,809 A | 11/1997 | Grube |
| 5,727,057 A | 3/1998 | Emery et al. |
| 5,774,824 A | 6/1998 | Streit |
| 5,801,700 A | 9/1998 | Ferguson |
| 5,802,492 A | 9/1998 | DeLorme et al. |

(Continued)

FOREIGN PATENT DOCUMENTS
GB 2305568 4/1997
(Continued)

OTHER PUBLICATIONS

International Search Report mailed Feb. 13, 2003, for PCT Application No. PCT/US02/22835, filed Jul. 16, 2002, five pages.
(Continued)

*Primary Examiner* — Paul Rodriguez
*Assistant Examiner* — Andre Pierre Louis
(74) *Attorney, Agent, or Firm* — William H. Bollman

(57) ABSTRACT

The present invention is directed to a system and method for presenting navigational directions using a combination of a mobile communication device, such as a cellular phone, and a complementary device, such as a vehicular navigational or display device. In particular, using location information acquired by the mobile communication device, driving direction is obtained (such as from a server) and displayed to a user via the complementary device. The mobile communication device and the complementary device maybe connected to each other over a wired connection or a wireless connection.

45 Claims, 9 Drawing Sheets

U.S. PATENT DOCUMENTS

| | | | |
|---|---|---|---|
| 5,904,727 A | 5/1999 | Prabhakaran | |
| 5,944,768 A | 8/1999 | Ito | |
| 5,982,301 A | 11/1999 | Ohta | |
| 6,049,718 A | 4/2000 | Stewart | |
| 6,084,951 A | 7/2000 | Smith | |
| 6,091,957 A | 7/2000 | Larkins et al. | |
| 6,138,003 A | 10/2000 | Kingdon | |
| 6,182,006 B1* | 1/2001 | Meek | 701/200 |
| 6,185,426 B1 | 2/2001 | Alperovich et al. | |
| 6,204,844 B1 | 3/2001 | Fumarolo | |
| 6,208,934 B1 | 3/2001 | Bechtolsheim et al. | |
| 6,226,367 B1 | 5/2001 | Smith | |
| 6,285,317 B1* | 9/2001 | Ong | 342/357.13 |
| 6,317,684 B1 | 11/2001 | Roeseler | |
| 6,321,158 B1 | 11/2001 | DeLorme | |
| 6,331,825 B1 | 12/2001 | Ladner | |
| 6,353,664 B1 | 3/2002 | Cannon | |
| 6,360,102 B1 | 3/2002 | Havinis et al. | |
| 6,366,782 B1 | 4/2002 | Fumarolo | |
| 6,366,856 B1 | 4/2002 | Johnson | |
| 6,377,210 B1 | 4/2002 | Moore | |
| 6,415,224 B1 | 7/2002 | Wako | |
| 6,441,752 B1 | 8/2002 | Fomukong | |
| 6,442,391 B1 | 8/2002 | Johansson | |
| 6,459,782 B1 | 10/2002 | Bedrosian et al. | |
| 6,466,788 B1 | 10/2002 | Carlsson | |
| 6,529,143 B2 | 3/2003 | Mikkola et al. | |
| 6,539,080 B1 | 3/2003 | Bruce | |
| 6,571,174 B2 | 5/2003 | Rigazio | |
| 6,621,423 B1 | 9/2003 | Cooper | |
| 6,640,185 B2 | 10/2003 | Yokota | |
| 6,643,516 B1 | 11/2003 | Stewart | |
| 6,674,849 B1 | 1/2004 | Froeberg | |
| 6,766,174 B1 | 7/2004 | Kenyon | |
| 6,775,371 B2 | 8/2004 | Elsey | |
| 6,801,850 B1 | 10/2004 | Wolfson | |
| 6,812,851 B1* | 11/2004 | Dukach et al. | 340/815.4 |
| 6,816,782 B1 | 11/2004 | Walters | |
| 6,819,919 B1 | 11/2004 | Tanaka | |
| 6,829,532 B2 | 12/2004 | Obradovich | |
| 6,839,630 B2 | 1/2005 | Sakamoto | |
| 6,885,874 B2 | 4/2005 | Grube | |
| 6,895,329 B1 | 5/2005 | Wolfson | |
| 6,910,818 B2 | 6/2005 | McLoone | |
| 6,934,705 B2 | 8/2005 | Tu et al. | |
| 6,944,535 B2 | 9/2005 | Iwata | |
| 6,970,871 B1 | 11/2005 | Rayburn | |
| 7,079,945 B1* | 7/2006 | Kaplan | 701/208 |
| 7,142,196 B1 | 11/2006 | Connor | |
| 7,142,205 B2 | 11/2006 | Chithambaram | |
| 7,167,187 B2 | 1/2007 | Scott | |
| 7,333,820 B2 | 2/2008 | Sheha et al. | |
| 7,653,544 B2 | 1/2010 | Bradley | |
| 2002/0022492 A1 | 2/2002 | Barak et al. | |
| 2002/0052786 A1 | 5/2002 | Kim et al. | |
| 2002/0059201 A1 | 5/2002 | Work | |
| 2002/0069239 A1 | 6/2002 | Katada | |
| 2002/0086683 A1 | 7/2002 | Kohar | |
| 2002/0169539 A1 | 11/2002 | Menard | |
| 2003/0014487 A1 | 1/2003 | Iwakawa | |
| 2003/0061211 A1 | 3/2003 | Shultz et al. | |
| 2004/0008225 A1 | 1/2004 | Campbell | |
| 2004/0204829 A1 | 10/2004 | Endo | |
| 2004/0229595 A1 | 11/2004 | Laursen | |
| 2005/0062636 A1 | 3/2005 | Conway | |
| 2005/0219067 A1 | 10/2005 | Chung | |
| 2005/0242168 A1 | 11/2005 | Tesavis | |
| 2007/0004461 A1 | 1/2007 | Bathina | |
| 2007/0064644 A1* | 3/2007 | Dowling et al. | 370/328 |
| 2007/0111703 A1* | 5/2007 | Holland et al. | 455/404.2 |
| 2007/0208687 A1 | 9/2007 | O'Connor | |
| 2008/0077324 A1 | 3/2008 | Hatano | |
| 2008/0129475 A1* | 6/2008 | Breed et al. | 340/438 |
| 2008/0170679 A1 | 7/2008 | Sheha et al. | |
| 2008/0288166 A1 | 11/2008 | Onishi | |

FOREIGN PATENT DOCUMENTS

| | | |
|---|---|---|
| WO | WO-96/36930 | 11/1996 |
| WO | WO-03/008992 A2 | 1/2003 |
| WO | WO-03/008992 A3 | 1/2003 |

OTHER PUBLICATIONS

International Search Report mailed Aug. 5, 2003, for PCT Application No. PCT/US03/06663, four pages.

International Search Report mailed Jul. 27, 2004, for PCT Application No. PCT/US2004/004559, three pages.

Supplementary European Search Report in European Appl. No. 06839236.4 dated Dec. 6, 2010.

* cited by examiner

SYSTEM AND METHOD FOR PROVIDING ROUTING, MAPPING, AND RELATIVE POSITION INFORMATION TO USERS OF A COMMUNICATION NETWORK

CROSS-REFERENCE TO RELATED APPLICATIONS

This is a divisional of U.S. patent application Ser. No. 10/194,518 filed Jul. 11, 2002, which in turn claims priority from U.S. provisional patent application Ser. No. 60/305,975 filed Jul. 17, 2001, which applications are specifically incorporated in their entirety by reference herein.

BACKGROUND OF THE INVENTION

1. Field of Invention

This invention relates to location and navigational systems and to the determination of local and remote position information in ad-hoc landline and wireless systems, including the utilization of unique identification addresses, such as telephone numbers or Internet Protocol (IP) addresses, for such purposes as providing real-time location information, maps, routing, and direction finding.

2. Description of the Related Art

Navigational systems, defined as systems that provide a unit's local position and a way of planning a course around the units local position, sometimes to a remote position, such as in-vehicle navigations systems do, are well know in the art. Typically, an in-vehicle navigation system consists of a display screen, processing unit, storage unit, and user input mechanism. The storage system typically contains, for example, maps and travel information used for navigational purposes. Travel information may include such items as points of interest, local restaurants, theaters, municipality locations, and the like.

Determining a local position in a navigation system has typically been done by integrating or connecting Global Positioning System (GPS) technology into the local navigational system. New positioning determination systems include network-assisted wireless location systems, such as TOA (Time-of-Arrival), and network assisted GPS systems for determining the local navigation system's position. The unit's location is then displayed on the device and is available for various applications, such as in the case of a commuter seeking the shortest route to a location in a specific area or a user wanting to find the nearest gas station.

Destination locations are typically determined by manually accessing stored information from a local database or navigational information storage system, such as a DVD disc or CD-ROM discs. Location information is found by searching through categories of information until the desired location is found, or alternatively, by cross referencing telephone numbers with addresses by means of the local storage system. Conventionally, numerous discs, or even numerous sets of discs, are required to provide adequate detailed geographic coverage, including address and telephone information about a given metropolitan area. That is, conventional in-vehicle navigation systems require that an extensive collection of storage discs be carried within the vehicle. Additionally, prior art DVD and CD-ROM disc based systems require periodic updating. That is, even after a user has purchased a set of discs, new replacement discs must be acquired, for example, as new roads and points of interest information are updated.

As an additional drawback, some navigation systems that do not have the storage capability, such as wireless PDAs (Personal Digital Assistant) or typical cell phones, are not able to implement cross referencing of telephone numbers to addresses locally due to the large memory and storage size requirements of such an operation and low computational power of the devices. Furthermore, since most businesses and individuals can change their telephone numbers numerous times while at their current address determining destination locations from telephone numbers on a locally-stored database inherently causes the information to be out of date and inaccurate. These and other changes, such as a new telephone line or an area code change, would invalidate the current version of locally-stored DVD or CD-ROM disc information. As a further drawback, mobile navigation devices and stationary landline computing devices are not always associated with telephone numbers, but rather Internet Protocol (IP) addresses or the like.

Convention art systems are typically incapable of obtaining position information over dynamically-configured connections such as, for example, current fleet tracking systems that require predefined user and/or device configurations before the transfer of position information is possible. Current systems for determining the location of numerous mobile navigation devices typically require users to register each device's network address, or the like, into a database. These types of systems typically have user/asset account creation procedures that are static and not dynamic. Each remote unit, which has access to its current position information from a connected positioning device or other positioning means, has an application that responds to a request for position information from a centralized server. These systems are viable options for organizations that must govern the tracking of assets that belong to the organization. However, should an outside system or individual desire to track another organization's asset for a short period of time and for one time only, the organization must then provide the network address of that asset as well as possibly providing permission to the outside organization or individual for the duration of their tracking needs. Once the permitted tracking has been accomplished, the system must shut down the outside account and possibly change the network address for security purposes. Additional security measures may be necessary to disable access by the outside user if the system has a firewall or other network security system in place.

Thus, a need exists for a system that determines local and/or remote position information which does not require an extensive collection of DVD or CD-ROM discs, which is able to provide location and destination address or position information given a telephone number, and which is up-to-date and reliable and can be accessed via a networked online server(s). Additionally, the need exists for a system that determines local and/or remote position information of devices that are not always associated by telephone numbers, but IP addresses or the like, and which can obtain such position information instantaneously and share it, by means of authentication and authorization protocols, without requiring any prior configuration.

SUMMARY OF THE INVENTION

It is an object of the present invention to provide an improved system for obtaining real-time remote and/or local position information in various environments for a plurality of purposes, such as mapping, routing, and direction finding.

It is another object of the present invention to provide a method for entering a telephone number by various means such as by using numeric, alphanumeric, speech-enabled interface, or software Application Interface (API), or the like, for the purpose of determining position information associated with the telephone number by searching a networked database.

It is yet another object of the present invention to provide a method for entering a unique identification token, such as an e-mail address, that can be used on a networked server system utilizing authentication and authorization procedures, in order to determine position information and to pass that information between a plurality of unique users or applications on various devices. The duration of the position information transfer can be governed by a defined transfer period that can be set prior to the start of the transfer or at any time thereafter.

It is yet another object of the invention to provide an alternative form of Caller-ID (Map Caller-ID) to a local computing telephone device for display of the caller's position information. Alternatively, using another computing device, a callers position information is transferred to a predefined local computer, via the Internet, telephone, or wireless network, and the position information to a caller is displayed on a capable viewing device identified and configured by the destination telephone user. This position information transfer is done utilizing authentication and authorization procedures or telephone-to-position information correlation procedures for caller identification. Additionally, similar information containing Map Caller-ID information about the destination telephone number can be transferred to the originating caller.

It is a further object of this invention to provide the calculation of position and route information, such as driving directions, as well as the ability to provide azimuth, elevation, altitude, altitude difference, line-of-sight (LOS) distance, and curved earth LOS distance measurements, between the local and remote positions calculated from the position information obtained using the methods previously described.

It is a further object of this invention to enable a local device, such as a wireless telephone or PDA, to acquire local or remote position information through the methods described above, and to pass any or all of that information to an additional navigation or computing device, such as an in-vehicle navigation system or a mobile computer, in order for that additional navigation or computing device to make better use of the acquired position information, such as for improved route calculation and/or improved display. This passing of information to an additional device can occur via another (or same) wireless, infrared or dedicated wired connection.

It is still a further object of this invention to provide means for downloading a predefined set of data containing telephone numbers correlated to position-specific information, such as latitude and longitude coordinates address information, and/or map information of varying size and resolution, from a networked server to a mobile device. The data transfer can occur via a wireless link, such as a cellular telephone or Bluetooth connection, via an infrared connection, or via a dedicated wired connection, such as a serial or USB connection. The information contained in the batch transfer consists of either a subset of or the entire dataset stored on the networked server. The data batch transfer can also employ geographical boundary restrictions. The data can be updated incrementally, when differences between the local and networked server's database is found, or when necessary, such as when a mobile system expects to travel out-of-range of its expected wireless coverage zone (as initiated by a push or pull architecture with the online networked server) and data updates are obtained for the region(s) where wireless connectivity will not be available.

It is yet another object of this invention to provide these aforementioned capabilities on various forms of devices, such as computing devices, telephone (both wired and wireless) devices, and devices with voice-over-IP (VoIP) capability.

These and other objects are met by the position determination, mapping, and routing system disclosed herein that assist the user, or a software application, in determining local and/or remote position(s) by using an online database and/or networked authentication and authorization connection server. There are three primary cases that apply to this invention: 1) landline-to-landline systems, 2) landline-to-mobile systems, and 3) mobile-to-mobile systems. The objective of each of these systems is the same, to determine either or both of the local and remote devices' position information.

In accordance with one embodiment of the present invention, for a landline-to-landline application, such as a call made between two standard telephones, a user can dial a telephone number to a remote device. The act of dialing the telephone number to another remote landline telephone, such as a residential telephone, triggers the transfer of position information, such as in the form of a map, to either one or both of the local and/or remote telephone devices. If the local and/or remote telephone devices do not incorporate a display unit, the position information can be routed to an adjacent computing and/or display device, such as a personal computer or cable television's set top box, that is connected to a network, such as a telephone or wireless network or the Internet. In this case, users who are initiating or receiving the telephone calls have their local telephone numbers stored into a database that resides on a secure network. Once the user has logged on to the personal computer via authentication and authorization procedures, any call that originates or is destined to their telephone number can identify the position of the other landline telephone number, based on predetermined privacy settings associated with the other landline telephone number. Alternatively, the user placing the call can obtain similar information about the destination telephone number.

In accordance with another embodiment of the present invention, for a landline-to-mobile application, such as a call made between a standard telephone and a wireless telephone, a user (or application) can dial a telephone number to a remote location. In one embodiment, if a user of a mobile telephone dials or specifies a landline telephone number, such as a business telephone number, the system would correlate the business telephone number to position-relevant information, such as address information and latitude and longitude coordinates. If the mobile telephone is connected to a position determination system, the mobile telephone would be able to provide navigational information, such as route information in the form of real-time driving directions, or else a map and address of the destination telephone number can be displayed on the mobile telephone.

In accordance with another embodiment of the present invention, for the mobile-to-mobile application, which is slightly similar to a landline-to-mobile application, position information can be obtained in various embodiments. In one embodiment, if a mobile device user specifies a telephone number of another position-enabled mobile device, the system would query the remote mobile device and verify its privacy setting. If there are no privacy settings, the system would request the position information from the remote mobile device and forward it back to the local mobile device. The local mobile device would then be able to navigate in real-time to the remote mobile device. In another embodiment, the destination remote mobile device receiving the telephone call obtains the position information from the calling local mobile device, based on permission settings of the calling local mobile device, for the performance of various operations, such as mapping and calculating driving directions. In this case, the calling local mobile device has privacy settings that determines the period of the position transfer to the destination remote mobile device. The period setting can be set for the duration of the call or for a predetermined length of time, and the position transfer can be terminated by the calling or receiving device at anytime. The calling local mobile device can also choose not to reveal its local position to the destination remote mobile device for privacy purposes at anytime and can conversely enable position transfer permissions at anytime and for any period of time or as long as the call is active.

In order to determine the position information of a remote landline or wireless device in order to obtain driving directions to that device or other related information about that device, in one embodiment, a user can initiate a position request by entering a unique identification token, such as an e-mail address. The remote user that is logged on to a wireless or landline position-enabled computing device is verified by the networked server's authentication and authorization protocol procedures. The server queries the remote party of the position request for permission on whether the position request can be granted based on criteria such as duration of request. If granted, both parties have access to each other's position information, which can be used for real-time driving directions or collaboration purposes. Once a user requests to terminate the transfer, either after a pre-defined time period ends or abruptly due to manual intervention by either party, the position transfer is preferably terminated by the system. In another embodiment, each device has privacy settings that allow the device to prevent or limit other calling devices from obtaining position information. These privacy settings can include allowance of position information transfers only when a voice or video connection is established and/or only with the device owner's permission. Other settings may include allowing any remote device to request position information for any specified amount of time.

Wireless and/or landline devices are not always suited to post-process the local and remote position information obtained from some of the methods previously described. In one embodiment, a wireless telephone that obtains both local and remote position information can pass the obtained position information to another device which can better process and/or display the data. This is applicable to current wireless phones that have limited resources, such as a small display area, low processing capability, limited memory, and short battery duration, in contrast to an in-vehicle navigation system that typically has an abundance of these resources. It is therefore advantageous and convenient, since most in-vehicle navigation system do not posses wireless capability, for the wireless telephone to pass the remote and/or the local, position information to the in-vehicle navigation system for processing and display of the route and map information. In this embodiment, the connection between the wireless telephone and in-vehicle navigation system can be established via a wireless connection, such as a Bluetooth connection, an infrared connection, or a wired connection such as a serial or USB cable.

Mobile devices do not always have access to a networked server for obtaining the latest updated database information, such as when wireless hardware access is not possible or when there is a lack of wireless network coverage. For this reason, another embodiment of the present invention provides a means to download batches of position information while the mobile device is connected using, for example, a wireless, infrared, or wired connection to the online networked database server, such as, for example, a mobile device connected to a PC as a conduit to the Internet and thus connected to the online networked database server. This can apply to wireless devices that have a predefined wireless coverage chart stored internally for the purpose of determining when a device is near the boundary of wireless coverage. If the mobile device is near such a boundary, the device can request, or pull, data from the online server that is necessary until the device is within the expected wireless coverage again. Alternatively, the system would correlate the mobile device's position to a wireless coverage chart, and upon a boundary edge, the system would send, or push, data for the area where there is no wireless coverage from the online server to the mobile device. In another embodiment, a mobile device, such as an in-vehicle navigation system, prior to leaving for a destination would download a batch of information for a specific geographical region from an online networked database server, since the car might not have Wide Area Network (WAN) access, such as a mobile Internet cellular telephone with Internet access would. In this embodiment, the in-vehicle navigation system preferably downloads the information from either a wireless, infrared, or wired connection to a networked online server. This data transfer can be initiated from various public points, such as, for example, a car garage or a gas station with a wireless networked-enabled hub.

DETAILED DESCRIPTION OF THE EMBODIMENT

Figure 1:
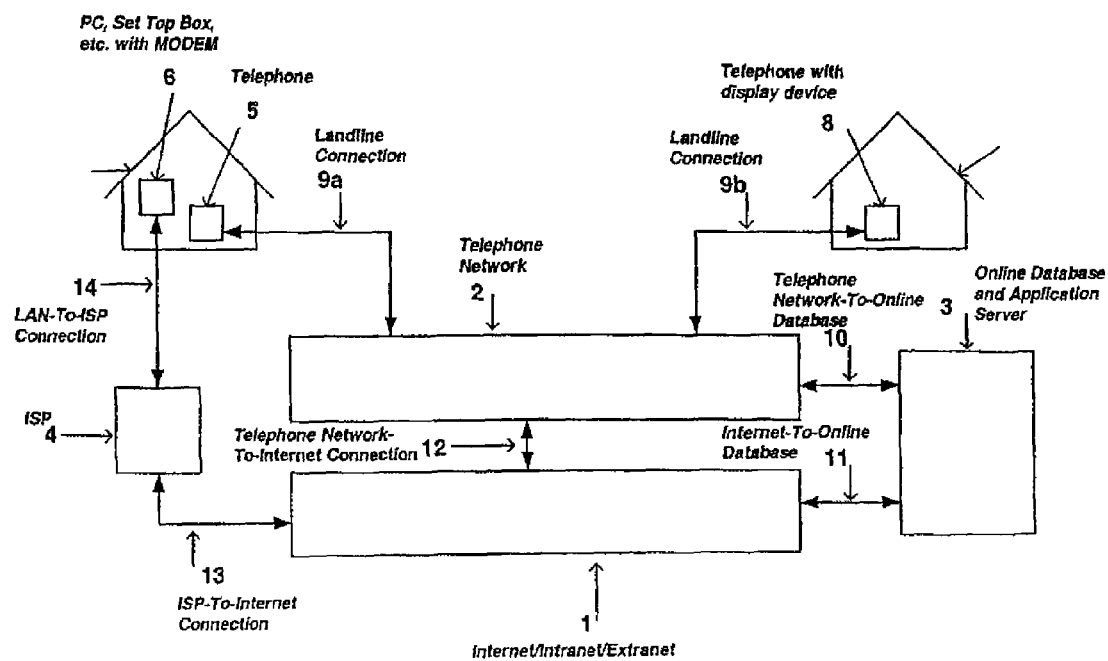
FIG. 1 illustrates how a typical landline-to-landline connection can be established using a plurality of different telephone and/or computing devices.

The various embodiments of the present invention will be described with reference to FIGS. 1-9. In the landline-to-landline example, as illustrated 5 in FIGS. 1-9, a user places a telephone call from a standard telephone 5 and 54 to a destination telephone, such as another landline telephone 8 and 55. The landline standard telephones are typically connected to the telephone network 2 through a dedicated landline connection 9a and 9b. The telephone number that is dialed is known to the telephone network 2. When a standard telephone 5 and 54 is used to place a telephone call, the telephone network 2 updates the online database and application server (ODAS) 3 with the originating and destination telephone numbers. In one embodiment this is typically done using a signaling system 7 (SS7) architecture via a connection 10 to the ODAS 3. The destination telephone 8 and 55 has an extended form of Caller-ID, such as consisting of a display, a processing unit, and a MODEM. This extended form of Caller-ID shall be denoted as Map Caller-ID, since it provides remote caller position information, and may include local address position information. In this embodiment Map Caller-ID works similarly to Caller-ID since a modem message is typically sent between the first and second rings over the dedicated landline connection 9b to the destination telephone 8. The difference is that Map Caller-ID includes additional position information fields of various formats, and can include map information at varying resolutions of both the origination and destination telephone number's locations. Typical Caller-ID is sent from the telephone network exchange 2 to the subscriber telephone 8 in one of many different formats and methods, depending on telephone carrier provider and/or region (i.e., USA, Finland, Netherlands, Japan, etc.).

In one embodiment the display unit on the destination telephone 8 can display the callers name, telephone number, address, and can provide a map illustration of varying resolutions configured by the user through the telephone network 2. Additionally, the telephone 8 can provide route and driving direction information between the originating telephone number's location 5 and the destination telephone number's location 8. The ODAS 3 determines the destination telephone's 8 position information by performing a reverse telephone number lookup, thus retrieving both geographical and address information of the called telephone 8 associated with its telephone number. This information is sent to the telephone network 2 to be incorporated into the Map Caller-ID data format.

Figure 4:
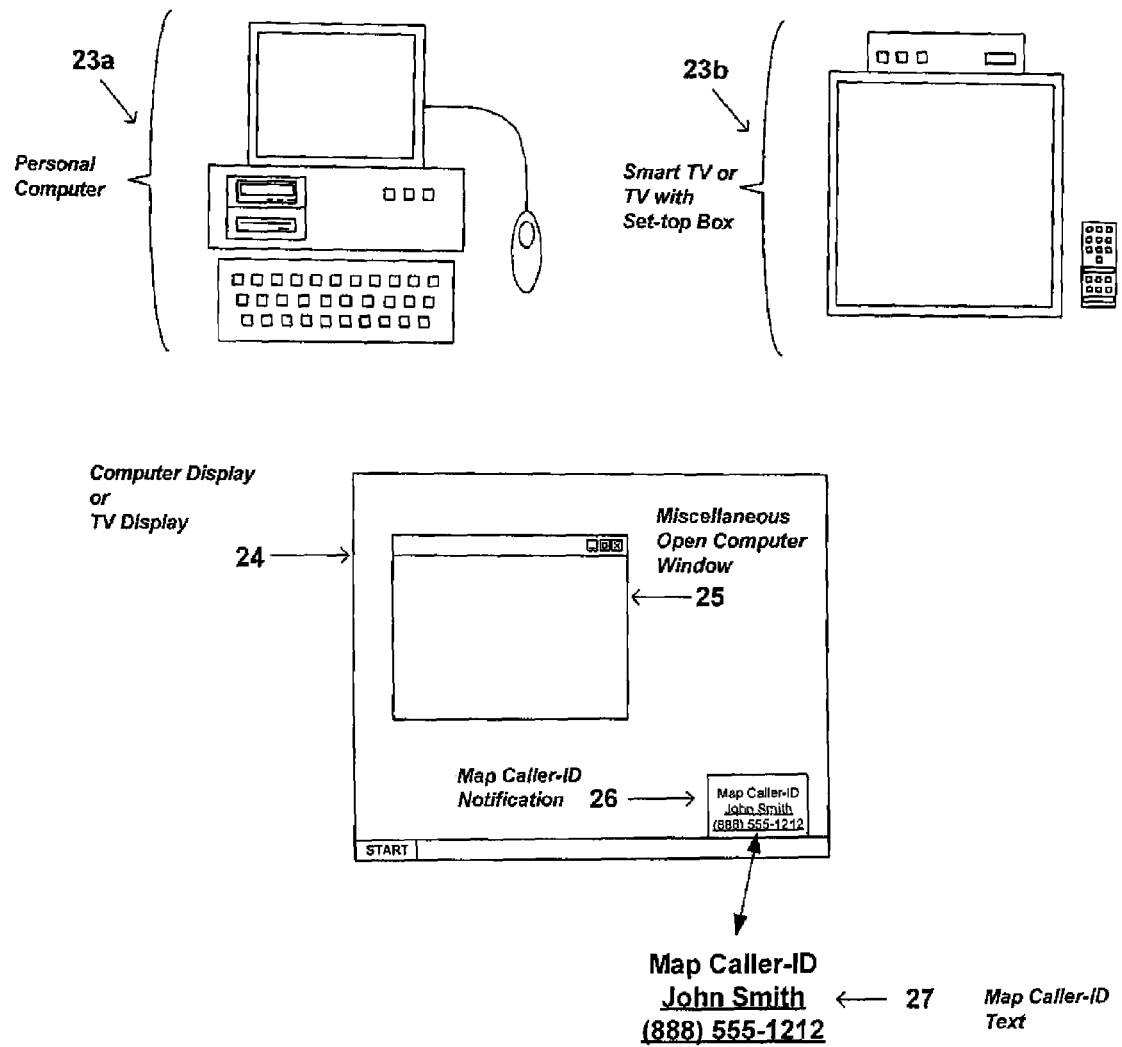
FIG. 4. illustrates an example of a Map Caller-ID indicator on a computing device display unit or television display.
Figure 5:
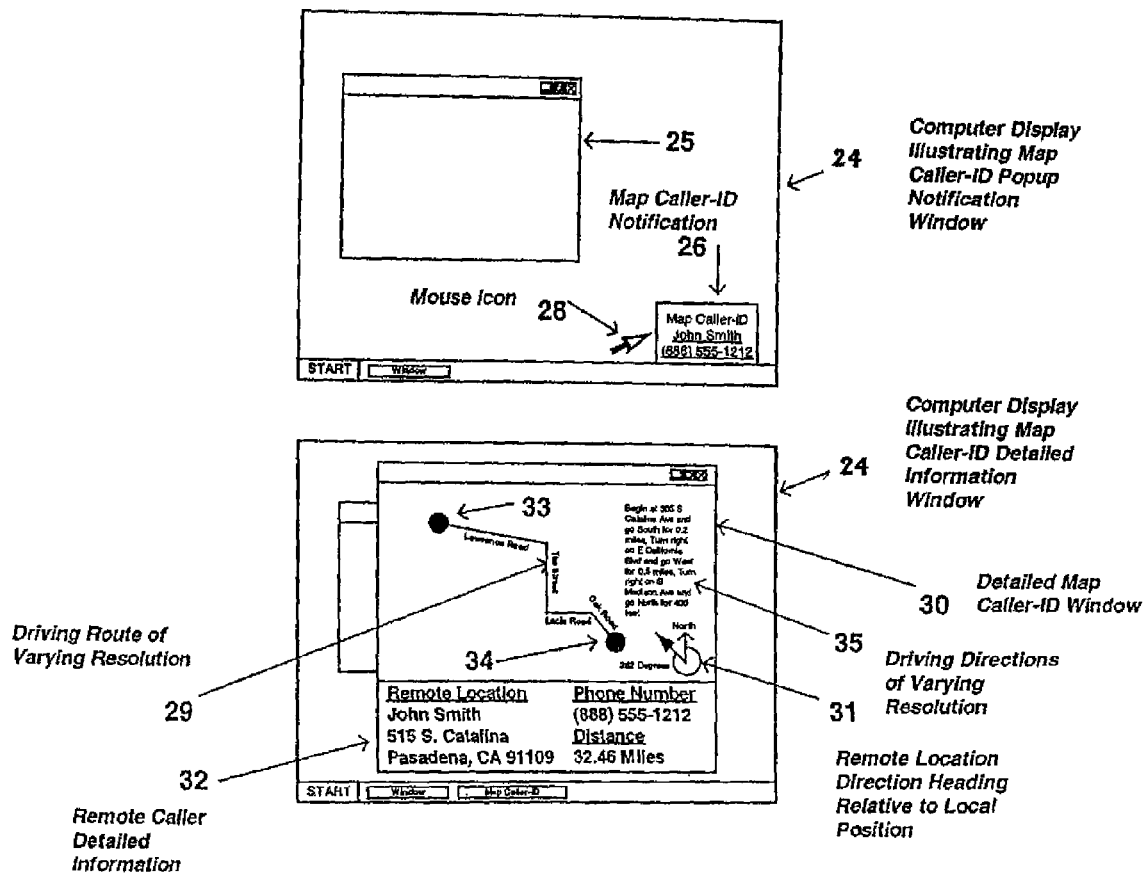
FIG. 5. illustrates an example of a Map Caller-ID indicator and a display window detailing a plurality of various possible features utilizing the position and/or address location information of the remote caller and local device or person that is called.

Additionally in FIG. 1, an advanced telephone 8 and 55 can establish a call with a standard telephone 5 and 54. Both telephones are typically connected to a telephone network 2 by means of a dedicated landline connection 9a and 9b. Since a typical standard telephone device 5 and 54 is incapable of displaying position information or decoding and processing the data from the telephone network 2, an accompany device can be used to facilitate such requirements, such as, for example, a personal computer (PC) 23a or Smart Television (TV) 23b as shown in FIG. 4.

In one embodiment, a Smart TV consists of a television with an integrated or attached cable television's set-top box, such as WebTV or Scientific Atlanta set-top commercial units. When a telephone device 8 dials a destination telephone 5 number, the number is typically sent to the telephone network 2 by means of a landline connection 9b. In this embodiment, the destination telephone 5 is not an advanced telephone 55 capable of decoding and displaying the Map Caller-ID information sent by the telephone network 2 over the dedicated landline connection 9a as previously described. Therefore, in order for the destination telephone 5 to have access to the Map Caller-ID information, it must be sent to an accompanying device 6, such as a PC 23a or Smart TV 23b, that is capable of displaying and processing the Map Caller-ID information. These devices, PC 23a or Smart TV 23b, typically have data connections in place that provide Internet connections, such as dial-up, DSL, Cable, or ISDN connections to the Internet. In this embodiment, the PC 23a or Smart TV 23b have a dedicated (i.e., always enabled) connection to the Internet via a DSL or Cable TV connection 14 to the subscriber's Internet Service Provider (ISP) 4. In another embodiment, the connection 14 to the device 6 can be a wireless connection, such as a CDMA, TDMA, or GSM wireless data connection.

Therefore, in this embodiment, when a telephone 8 dials a destination standard telephone 5, the destination telephone number is sent over the dedicated landline connection 9b to the telephone network 2. The ODAS 3 is sent both the originating and destination telephone numbers via the telephone network connection 10. In another embodiment, accompanying information, such as user identification information associated with each telephone number is also sent to the ODAS 3. The ODAS 3 is also connected to the Internet, Intranet or Extranet 1 that is connected to the ISP 4, which is connected to the PC 23a or Smart TV 23b by a dedicated connection 14. The ODAS 3 is preferably notified that a telephone call is being established by the telephone network 2. Included in this notification is the telephone number and user identification information for both the originating and destination telephone numbers. In this embodiment, every telephone account user has a username and password for the ODAS 3. When the ODAS 3 is notified from the telephone network 2 that a telephone call is being established, the ODAS 3 correlates both the origin and destination telephone users' identifications to verify if the user is signed-on to the ODAS 3 using authentication and authorization protocols. These authentication and authorization protocols establish that a user is genuine and verify the level of authority each user is granted, such as for differentiating services provided by the ODAS 3. These protocols also provide presence capability by notifying the ODAS 3 that a particular user is signed-on to the system on a particular device, such as the PC 23a or Smart TV 23b.

After the telephone network 2 has notified and sent the ODAS 3 all of the appropriate information, the ODAS 3 validates that the users associated with the origin and destination telephone numbers are signed-on to the ODAS 3. In this embodiment, only the user of the destination telephone number is signed-on to the server 3, but this can also apply to the user of the originating telephone number. After the system has verified that the destination telephone number user is signed-on, the ODAS 3 sends a notification to the device 6 that the user is signed-on. In this embodiment, this information is typically sent to the Internet, Intranet or Extranet 1 through a dedicated connection 11 and then is connected to the user's ISP 4 which is also connected to the Internet, Intranet or Extranet 1 by a dedicated connection 13. In this embodiment, the ISP has a dedicated connection 14 to the end device 6, thus the ODAS 3 has a pathway to the end user's device 6, such as the PC 23a or Smart TV 23b.

In this embodiment, the notification appears on the user's display device 6 just prior or during the ringing or notification that the telephone has an incoming telephone call. In one embodiment, the display 24 (FIG. 4) of the user's device shows that he or she is signed-on and can have numerous miscellaneous window(s) 25 open at the time the Map Caller-ID notification window is activated. The Map Caller-ID notification window 26 typically contains only the originating user identification and telephone number, but may also contain map information of varying resolution. In one embodiment, the user may use a mouse icon 28 to activate the original notification window 26 to access additional information. In this embodiment, if the user does not activate the original notification window 26 for additional information, the notification window 26 will disappear after a predefined time period. After the notification window 26 has been activated by the mouse icon 28, which is controlled by the user, the notification window 26 closes and a new information window 30 appears.

In one embodiment, this new information window 30 is a detailed Map Caller-ID information window of varying resolution displaying the originating position information, such as a map location 33 of the caller, and the user's location position information, such as a map location 34 of the destination telephone number. The window 30 can also provide a driving route 29 of varying resolution and driving directions 35 of varying resolution. The window 30 can also display remote location direction heading information relative to local position information 31 in addition to elevation, line-of-sight distances, and curved Earth line-of-sight distances. Additionally, the window 30 can display all of the identification information 32 of both the originating and destination users, such as addresses and telephone numbers, and provide driving direction distance information for the optimal route based on criteria such as time-of-day turn restrictions and highway or surface street preferred usage.

Figure 2:
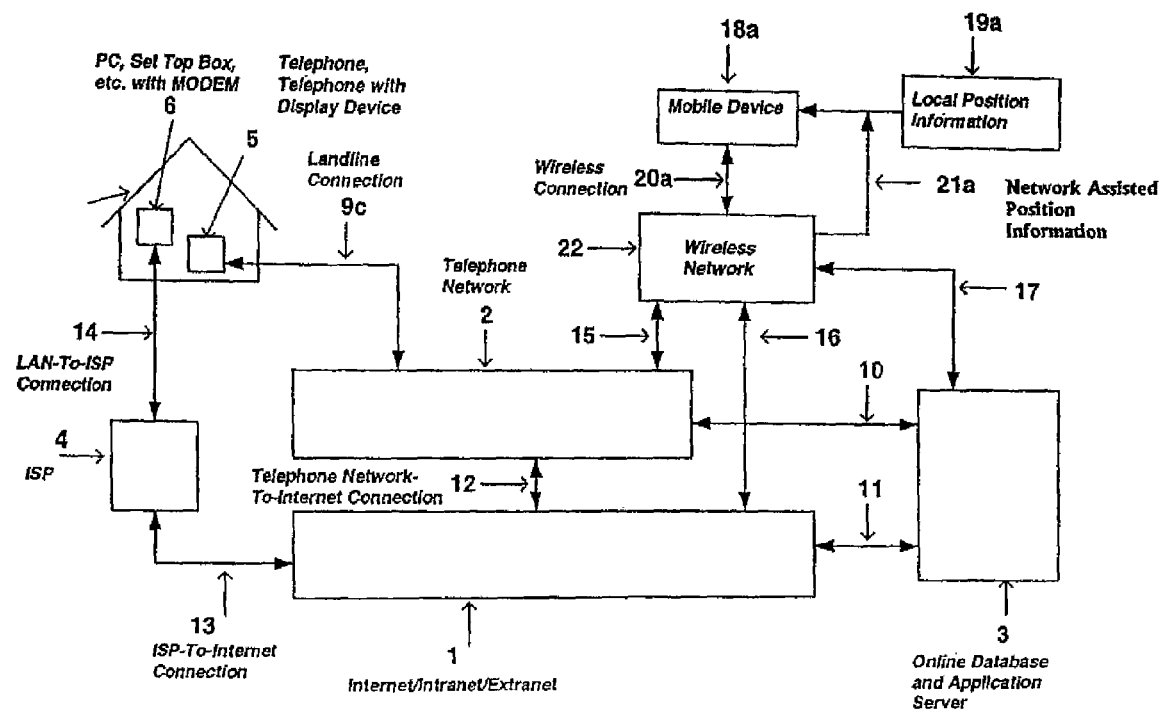
FIG. 2 illustrates how a typical landline-to-mobile connection can be established using a plurality of different telephone and/or computing devices.

In the landline-to-mobile example, as illustrated in FIG. 2, a user of a mobile device 18a, such as a cellular telephone or wireless voice-enabled PDA, dials or inputs a telephone number. Since in this embodiment, the destination telephone number is associated with a landline device 5, the system is able to utilize methods previously described in the landline-to-landline example for obtaining the destination telephone number's relevant position information. The difference of this example from the previous lies in the information transfer path back to the originating mobile device.

In another embodiment, a user placing a telephone call from a landline device 5, such as a standard telephone, to a mobile device 18a, such as a cellular telephone or wireless voice-enabled PDA, dials or inputs a telephone number. The telephone number that is dialed from the landline telephone device 5 is known to the telephone network 2, and, in this embodiment, is sent over a dedicated landline connection 9c. The telephone network notifies the ODAS 3 that a telephone call is being established by means of a dedicated connection 10. In another embodiment, this dedicated connection can be established via a connection 12 to the Internet, Intranet or Extranet 1 and then by a connection 11 to the ODAS 3. Once the ODAS 3 has been notified of all the appropriate information, the system verifies, by using authorization and authentication protocols, if the user of both the originating and destination telephone numbers are signed-on to the system. For this embodiment, the landline notification method is the same as previously described in the landline-to-landline example, except that the ODAS 3 must request the location of the mobile device 18a, since the device can always be moving, prior or during to the connection of the telephone call.

The location of the mobile device is typically calculated by the mobile device 18a by using an onboard positioning information device 19a that is connected to the mobile device, or by getting network-assisted position information 21a from the wireless network 22 through a separate or same wireless connection, such as, for example, Time-Of-Arrival (TOA) algorithm techniques. The position information can also be obtained from a combination of an onboard positioning information device 19a, such as a GPS receiver, and a network-assisted approach 21a, such as having the network send ephemeris data to the GPS receiver to help achieve faster time-to-fix techniques.

The mobile device location information can be provided only, due to privacy settings, if the user configured the mobile device 18a to allow position information to be received while calls are received. In another embodiment, the privacy configuration also includes settings such as the option to never send position information, or to send position information while receiving and/or sending calls, and whether the transfer of position information should be allowed only for an instance or for a given period of time. This provides the user the opt-in capability for position information transfer.

In this embodiment, the mobile device Map Caller-ID notification is sent to the mobile device as a conventional Caller-ID message is sent, except additional information is added to the original message. This information is sent to the telephone network 2 via a direct connection 10, and then to the wireless network 22 via a direct connection 15. The wireless network 22 is connected to the wireless device 18a by means of a wireless connection 20a, such as a radio frequency (RF), optical, or infrared connection, using various connection standards, such as CDMA, GSM, GPRS, WCDMA, or CDMA2000. In one embodiment, the Map Caller-ID information sent to the mobile device contains the originating position and user identification information, since the local position information 19 or 21 is already known. In another embodiment, the Map Caller-ID information is sent directly to the wireless network 22 through a dedicated connection 17.

All of the Map Caller-ID information provided in the landline-to-mobile example is similar to that provided in the landline-to-landline example, except the mobile device's 18a position can change. In this embodiment, after the telephone call has been established, the mobile device, based on its privacy settings, continually sends updated position information to the ODAS 3. The ODAS 3 then sends the new updated position information to users of both the mobile device 18a and landline display device 6. For this scenario, since the landline device position information never changes, it is unnecessary to send updated position information about the landline device to the mobile device 18a. Providing real-time position information allows both the mobile device 18a and the landline display device 6 to display their real-time positions on a map of varying resolution, and to route and display driving direction information as the mobile device changes its position. In this embodiment, this position information exchange can last for the length of the telephone call or for a specified period of time which is determined by both the user of the originating mobile device 18a and the user of the landline destination 5 telephone.

Figure 3:
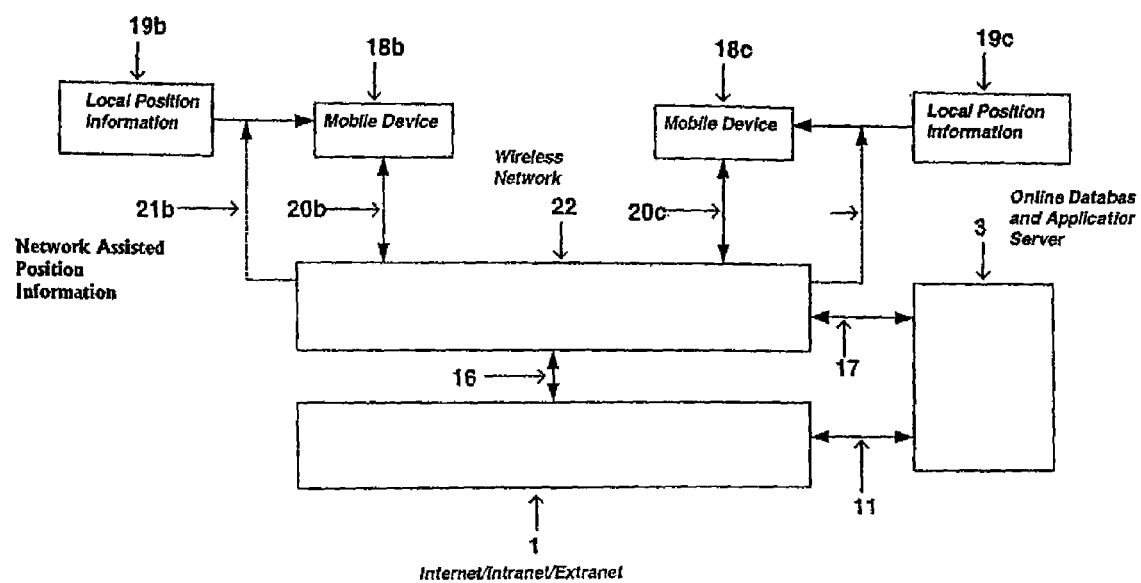
FIG. 3. illustrates how a typical mobile-to-mobile connection can be established using a plurality of different telephone and/or computing devices.

In the mobile-to-mobile example, as illustrated in FIG. 3, a user placing a telephone call from a mobile device 18b, such as a cellular telephone or wireless voice-enabled PDA, dials or inputs a telephone number of another 15 mobile device 18c. In this embodiment, since both the originating and destination telephone numbers are associated with mobile devices, the position information of each device can be updated in the ODAS 3 prior to establishing the telephone call, depending on each mobile device's 18b and 18c privacy settings. In another embodiment, peer-to-peer position information transfer is possible.

In this embodiment, all position information is allowed to be transferred for all scenarios on each mobile device 18a and 18c. When a mobile device IBb dials a telephone number, the position information and destination telephone number is transferred to the wireless network 22 by means of a wireless connection 20b. The position information is calculated, prior to the transfer, by means of an onboard positioning information device 19b that is connected to the mobile device 18b, or by receiving position information from the wireless network 22 using a network assisted positioning approach 21b. The ODAS 3 receives both the originating and destination telephone numbers, users' account information, and position information for both mobile devices 18b and 18c. In one embodiment, the information from the mobile device 18b is relayed to the ODAS 3 through the wireless connection 20b into the wireless network 22, and through the dedicated server connection 17. In another embodiment, the information from the mobile device 18b is relayed to the ODAS 3 through the wireless connection 20b into the wireless network 22, through the dedicated connection 16 into the Internet, Intranet or Extranet 1, and then through the dedicated connection 11 to the ODAS 3. In another embodiment, the ODAS 3 requests position information from the destination mobile device 18c. This request, after reaching the wireless network 22, is sent across the wireless connection 20c to the mobile device 18c.

The mobile device 18c then preferably forwards its current position information back to the ODAS 3. In one embodiment, prior to the destination mobile device 18c receiving the telephone call from the originating mobile device 18b, the wireless network sends the position information, obtained from the ODAS 3, in the form of a Map Caller-ID, as previously described. In this embodiment, both the originating and destination mobile device receive the Map Caller-ID information. The mobile devices 18b and 18c continually send their updated position information to the ODAS 3, when the position information has changed significantly as compared to the positioning error probability and as determined by the positioning technology or network configuration. The ODAS 3 periodically updates each mobile device with the other's position information, thus providing real-time driving directions and route information. In another embodiment, the position information transfer can be sent in a peer-to-peer configuration, thus circumventing the ODAS 3.

A mobile or landline device can also request position information of another mobile or landline device by only specifying a telephone number, without having to initiate a telephone call. For a landline-to-landline position request, the specified telephone number is correlated to its position information using telephone information from a known database or sets of databases. In one embodiment, the online database that contains this information only includes users that do not have unlisted telephone numbers. In another embodiment, users can define a group of specific users that have access to this information. This is also accomplished by utilizing a group database and authorization and authentication protocols to identify users that are permitted to access this information. When a mobile device's position information is requested, the system, based on privacy settings, responds with the appropriate position information to the requesting user's device. In another embodiment, using the authorization and authentication protocols a user can request the position of a mobile device, similarly to requesting the position of a landline device.

Figure 6:
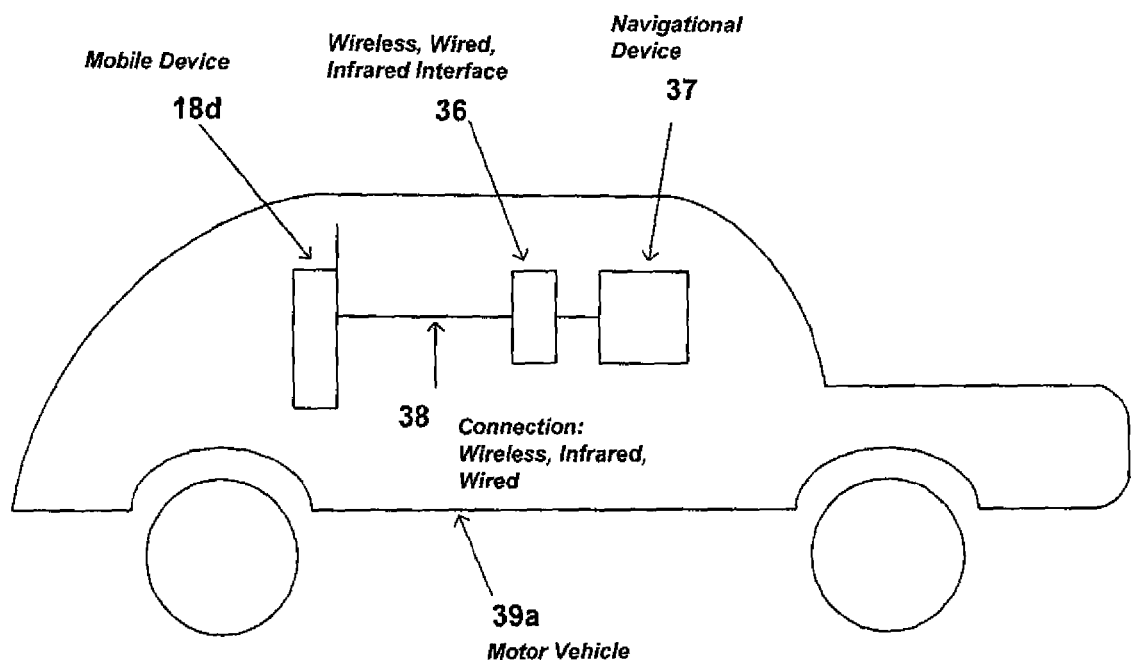
FIG. 6. illustrates an example of using a mobile telephone to obtain is position information of the remote device and possibly the local device's position information and then pass that information to another more capable processing and/or display device such as an in-vehicle navigation system via some form of wired, wireless, or infrared connection to process and/or display the data.
Figure 6:
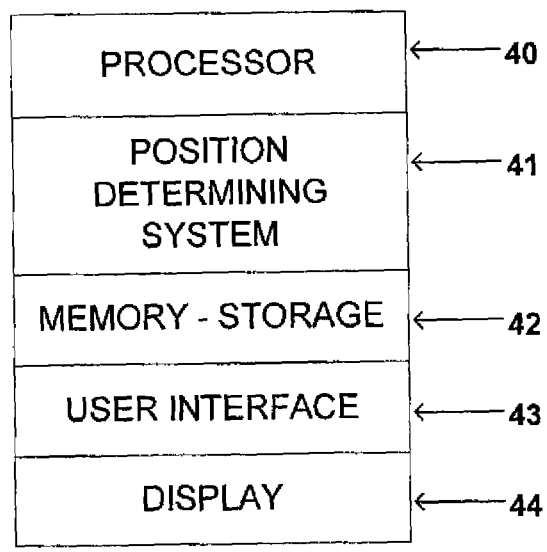

Using a mobile device 18d, as illustrated in FIG. 6, it is possible to obtain the unit's local position and a destination position for the purpose of navigation. However, a typical mobile navigational device 18d, such as a cellular phone or wireless PDA, does not possess all of the capabilities or is not optimal for navigational purposes. An accompanying device 37, such as an in-vehicle navigational device usually installed in a motor vehicle 39a, is better suited for navigational displays and computations. In one embodiment, once the mobile device 18d has obtained either the local or remote position information, via a wireless, such as a Bluetooth or 802.11b, connection, or a wired, such as USB or serial, connection, or an infrared or optical connection, it is sent by such connection 38 to a complementary connection interface device 36 that is connected to the navigational device. A typical navigational device contains a processor 40, a position determining system 41, a memory or storage device 42, a user interface 43, and a display 44. In some embodiments, a user interface 43 and display 44 are combined as a touch sensitive display. Once the position has been obtained, as previously described, the navigational device can utilize this position information to provide typical navigational functionality, such as routing, driving directions, mapped information, etc.

In another embodiment, the mobile device 18d calculates all of the navigational information internally by means of the ODAS 3 and passes the information over to the another device 37, such as a mobile computer, via a compatible connection interface 36 only to better display the information. As the mobile device 18d moves, or its position changes, position and/or data information is sent to the navigational device 37, via the interface connection 36 for real-time accurate data updates on the navigational device 37.

One feature of this system is the use of a telephone number to obtain position information associated with the telephone number from a networked online server. The system utilizes an ODAS 3 to facilitate this function, where the database is updated so that the data is always accurate and reliable. Thus if a mobile navigational device 45, such as a PDA, cellular telephone, or mobile computer, requires telephone-to-position information capability, and it does not have wireless connectivity or will travel outside known wireless coverage regions, the mobile navigational device can download a batch of data specific to the geographical region where there is no wireless coverage from the ODAS 3 when appropriate, thus providing the most accurate and reliable data to the user or application requesting this information.

Figure 7:
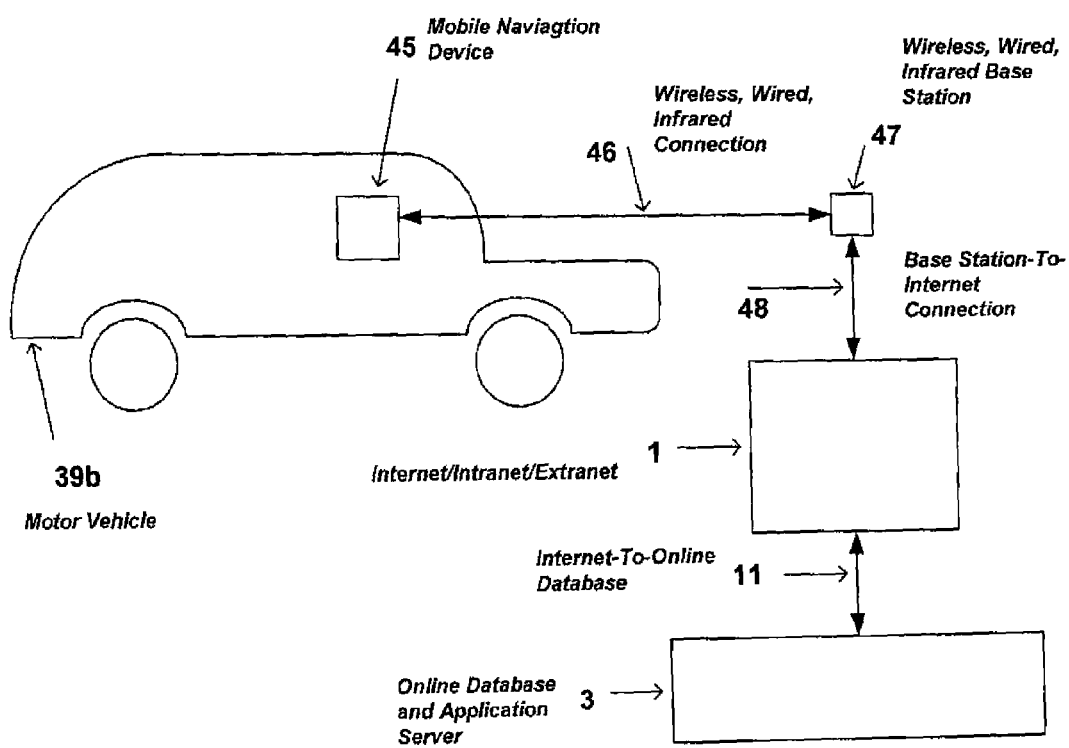
FIG. 7. illustrates an example of using a wireless connection to download a set of correlated telephone-to-address and/or position dataset information when a wireless connection is not possible or unnecessary.

In one embodiment, as illustrated in FIG. 7 a motor vehicle 39b contains a mobile navigational device 45, such as a PDA, cellular telephone, or mobile computer in the vehicle. Since the mobile navigational device 45 does not have a wireless connection, it is not possible to connect to the ODAS 3 while driving. However, the mobile navigational device 45 has a USB port and can download the expected geographical region where the motor vehicle 39b is expected to travel. In this embodiment, the mobile navigational device 45 can connect via a USB cable 46 to a USB hub 47 that has a connection 48 to the Internet, Intranet or Extranet 1 which is connected 11 to the ODAS 3. The mobile navigational device 45 then downloads all of the data necessary to perform the telephone number to position information calculations while en route, insuring that the data is the most accurate possible for this application.

In another embodiment, a motor vehicle 39b contains a mobile navigational device 45, such as a PDA, cellular telephone, or mobile computer, which has wireless connectivity. In this embodiment, the mobile navigational device 45 can obtain telephone number to position information from the ODAS 3 by connecting through the wireless connection 46 to the wireless network interface 47, which is then connected 48 to the Internet, Intranet or Extranet 1, which is then connected 11 to the ODAS 3. Having a connection from the mobile navigational device 45 to the ODAS 3 is dependent on having wireless coverage. If the mobile navigational device 45 is not within a wireless coverage area, the mobile navigational device 45 can not obtain position information given a telephone number because it does not have access to the ODAS 3. Since wireless coverage is known in advance, it is possible to store the wireless coverage charts on the ODAS 3 or on the mobile navigational device 45. In one embodiment, the wireless coverage charts are stored on the mobile navigational device 45 and updated when changed. Therefore when the mobile navigational device 45 is traveling inside known wireless regions, the mobile navigational device 45 will extrapolate its course to determine when it will travel outside of wireless coverage. The system will download, or pull, all of the nearby data information along the expected route from the ODAS 3 until the system is expected to be within a wireless coverage area again.

Figure 8:
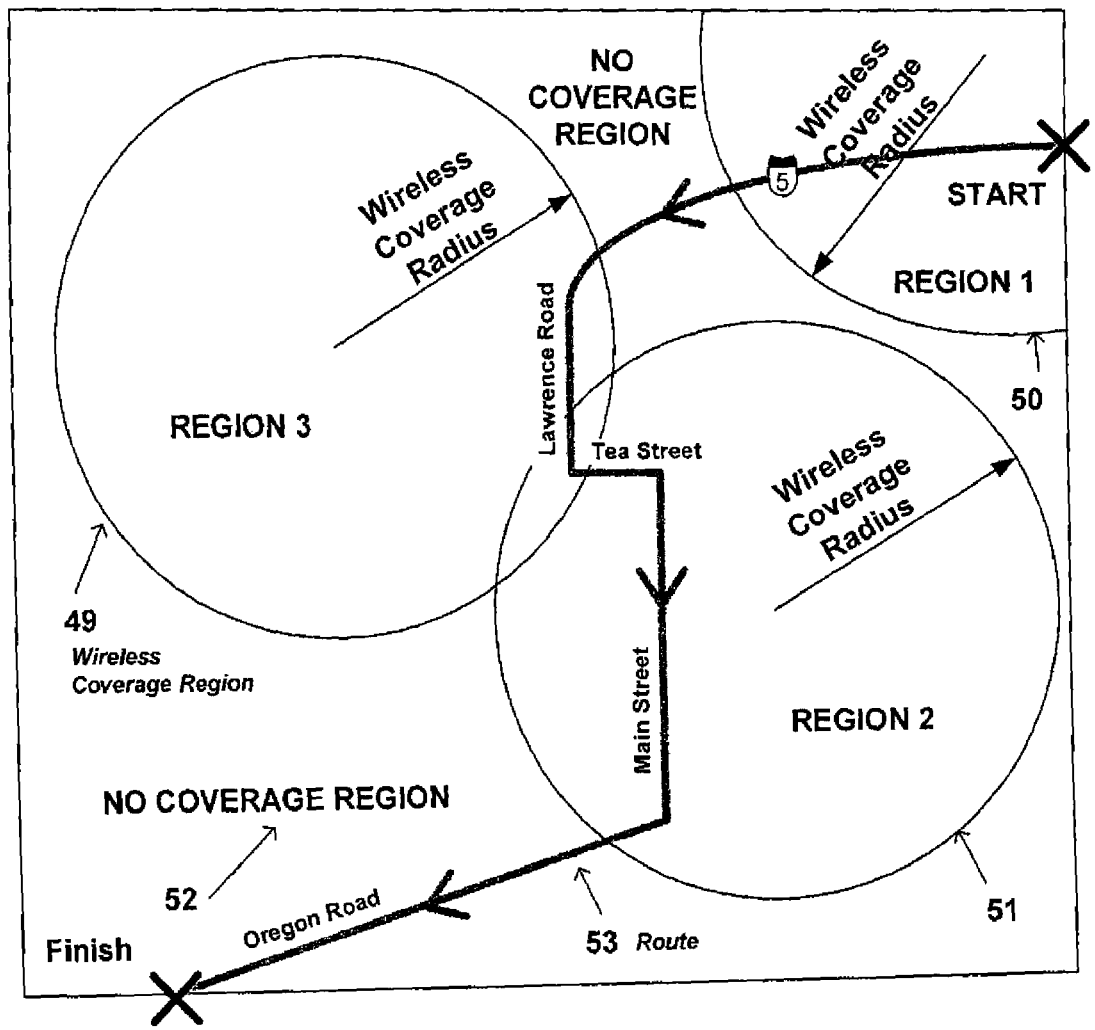
FIG. 8. illustrates several predefined wireless coverage areas overlaid with a driving route that extends within and outside the wireless coverage areas.
Figure 9:
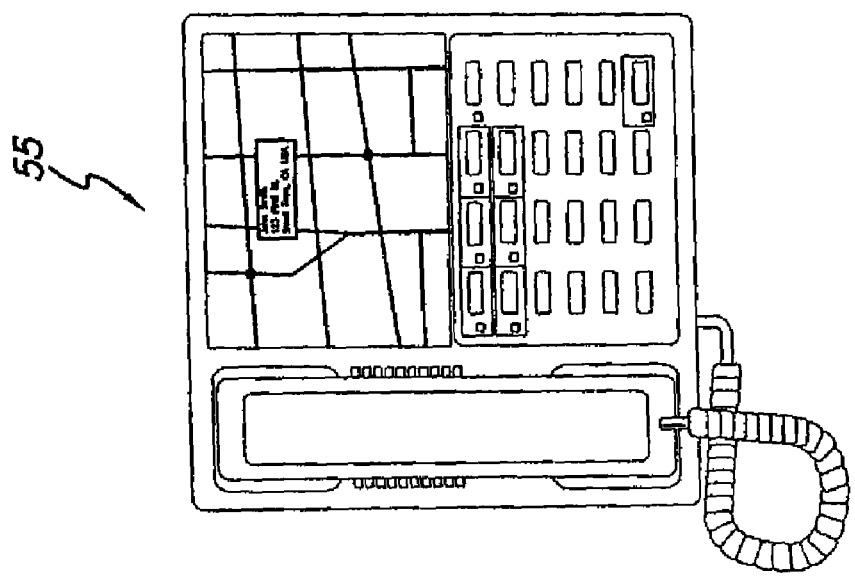
FIG. 9. illustrates an example of a standard telephone and an advanced telephone device with an integrated display unit.
Figure 9:
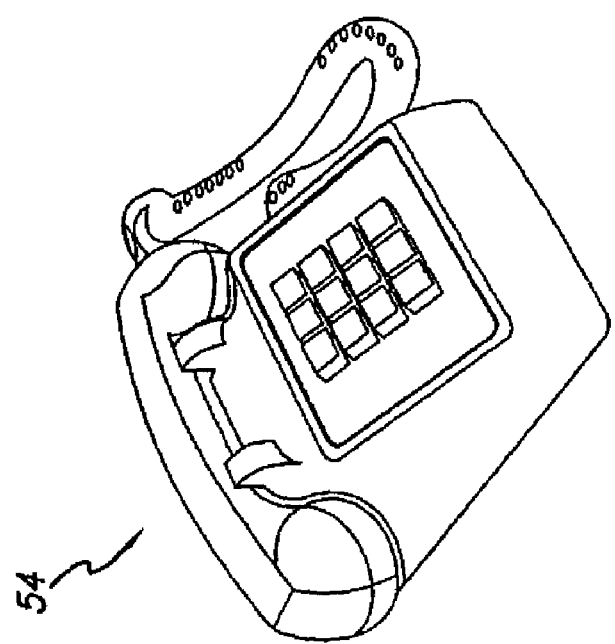

In another embodiment, as illustrated in FIG. 8, the mobile navigational device 45 calculates a route 53 from a START position to a FINISH position. The route 53 information is then correlated to an online wireless coverage chart that is stored on the ODAS 3. The online wireless coverage chart contains regions 49 and 50 and 51 where there is wireless coverage. The ODAS 3 calculates the regions 52 surrounding the expected route 53 that have no wireless coverage. The ODAS 3 then sends, or pushes, the relational data that is not obtainable due to lack of wireless coverage connectivity to the mobile navigational device 45. This insures that the data for telephone to position information is always up-to-date, reliable, and accurate.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A method for presenting navigational information using a wireless communication device including a GPS receiver, said method comprising:
   receiving location information of said wireless communication device using said GPS receiver of said wireless communication device, said location information indicating a location of said wireless communication device;
   receiving destination information, said destination information indicating a location of a destination;
   sending, from said wireless communication device, a request for navigational information, said navigational information including route information for traveling between said location of said wireless communication device and said location of said destination, wherein said request for navigation information is sent to a server over a telecommunication network;
   wherein the server queries a remote party of position request for permission on whether the position request can be granted based on criteria;
   receiving, by said wireless communication device from said server over said telecommunication network, said navigational information;
   sending, from said wireless communication device to an in-vehicle navigational device, said navigational information generated with said wireless communication device; and
   displaying, at a display device of said in-vehicle navigational device, driving directions for traveling between said location of said wireless communication device and said location of said destination based on said navigation information received from said wireless communication device.

2. The method according to claim 1, wherein said communication between said wireless communication device and said in-vehicle navigational device is established via a wireless connection.

3. The method according to claim 2, wherein said wireless connection is one of an IEEE 802.11b connection and an infrared connection.

4. The method according to claim 1, wherein said wireless communication device is a cellular phone.

5. The method according to claim 1, further comprising:
   receiving, at said wireless communication device, one of map data and point of interest data from said server; and
   sending, from said wireless communication device to said in-vehicle navigational device, one of said map data and said point of interest data.

6. A non-transitory storage medium containing a computer program having at least one code executable by a wireless communication device to present navigational information, said wireless communication device having a display, an input interface and a GPS receiver, said computer program having at least one code causing said wireless communication device to execute instructions comprising:
   receiving location information of said wireless communication device from said GPS receiver of said wireless communication device, said location information indicating a location of said wireless communication device;
   receiving destination information, said destination information indicating a location of a destination;
   sending, from said wireless communication device, a request for navigational information, said navigational information including route information for traveling between said location of said wireless communication device and said location of said destination, wherein said request is sent to a server over a telecommunication network;
   wherein the server queries a remote party of position request for permission on whether the position request can be granted based on criteria;
   receiving by said wireless communication device, from said server over a telecommunication network, said navigational information; and
   sending, from said wireless communication device to said in-vehicle navigational device, said navigational information generated with said wireless communication device to cause an in-vehicle navigational device including a display device to present driving directions for traveling to said location of said destination based on said navigation information received from said wireless communication device.

7. The non-transitory storage medium according to claim 6, wherein said communication between said wireless communication device and said in-vehicle navigational device is established via a wireless connection.

8. The non-transitory storage medium according to claim 7, wherein said wireless connection is one of a IEEE 802.11b connection and an infrared connection.

9. The non-transitory storage medium of claim 6, wherein said wireless communication device is a cellular phone.

10. The non-transitory storage medium according to claim 6, said method further comprising:
    receiving, at said wireless communication device, one of map data and point of interest data from said server; and
    sending, from said wireless communication device to said in-vehicle navigational device, one of said map data and said point of interest data.

11. A wireless communication device comprising:
    a display;

an input interface for receiving user inputs;
a GPS receiver for receiving location information of said wireless communication device, said location information indicating a location of said wireless communication device;
a memory; and
a processor, said processor being programmed to perform instructions comprising:
receiving destination information, said destination information indicating a location of a destination;
sending a request for navigational information, said navigational information including route information for traveling between said location of said wireless communication device and said location of said destination, wherein said request is sent to a server over a telecommunication network;
wherein the server queries a remote party of position request for permission on whether the position request can be granted based on criteria;
receiving by said wireless communication device, from said server over a telecommunication network, said navigational information; and
sending, from said wireless communication device to an in-vehicle navigational device, said navigational information generated with said wireless communication device, wherein said in-vehicle navigational device is comprised of a display device to display driving directions for traveling between said location of said wireless communication device and said location of said destination.

12. The wireless communication device according to claim 11, wherein said communication with said in-vehicle navigational device is established via a wireless connection.

13. The wireless communication device according to claim 12, wherein said wireless connection is one of a IEEE 802.11b connection and an infrared connection.

14. The wireless communication device according to claim 11, wherein said mobile communication device is a cellular phone.

15. The wireless communication device according to claim 11, wherein said processor is programmed to further perform instructions comprising:
receiving one of map data and point of interest data from said server; and
sending to said in-vehicle navigational device one of said map data and said point of interest data.

16. A method for presenting navigational information using a wireless communication device having a display, an input interface and a GPS receiver, and a complementary device, said method comprising:
receiving location information of said wireless communication device using said GPS receiver of said wireless communication device, said location information indicating a location of said wireless communication device;
receiving destination information via said wireless communication device, said destination information indicating a location of a destination;
generating navigation information, with said wireless communication device, for traveling between said location of said wireless communication device and said location of said destination;
sending, from said wireless communication device, a request for navigational information, said navigational information including route information for traveling between said location of said wireless communication device and said location of said destination, wherein said request for navigation is sent over to a server over a telecommunication network,
wherein the server queries a remote party of position request for permission on whether the position request can be granted based on criteria; and
wherein a display device of an in-vehicle navigational device displays driving directions for traveling between said location of said wireless communication device and said location of said destination, said driving direction being based on said navigation information sent by said wireless communication device.

17. The method according to claim 16, wherein said communication between said wireless communication device and said in-vehicle navigational device is established via a wireless connection.

18. The method according to claim 17, wherein said wireless connection is one of a IEEE 802.11b connection and an infrared connection.

19. The method according to claim 16, wherein said wireless communication device is a cellular phone.

20. The method according to claim 16, further comprising:
sending one of map data and point of interest data from said wireless communication device to said in-vehicle navigational device.

21. A non-transitory medium containing a computer program having at least on code executable by a wireless communication device to present navigational information, said wireless communication device having a display, an input interface and a GPS receiver, said computer program having at least one code causing said wireless communication device to execute instructions comprising:
receiving location information of said wireless communication device using said GPS receiver of said wireless communication device, said location information indicating a location of said wireless communication device;
receiving destination information, said destination information indicating a location of a destination;
generating navigation information, with said wireless communication device, for traveling between said location of said wireless communication device and said location of said destination;
establishing communication between said wireless communication device and an in-vehicle navigational device, said in-vehicle navigational device including a display device;
sending, from said wireless communication device, a request for navigational information, said navigational information including route information for traveling between said location of said wireless communication device and said location of said destination, wherein said request for navigation is sent over to a server over a telecommunication network,
wherein the server queries a remote party of position request for permission on whether the position request can be granted based on criteria; and
wherein said navigational information causes said in-vehicle navigational device to display driving directions for traveling between said location of said wireless communication device and said location of said destination.

22. The non-transitory storage medium according to claim 21, wherein said communication between said wireless communication device and said in-vehicle navigational device is established via a wireless connection.

23. The non-transitory storage medium according to claim 22, wherein said wireless connection is one of a IEEE 802.11b connection and an infrared connection.

24. The non-transitory storage medium according to claim 21, wherein said wireless communication device is a cellular phone.

25. The non-transitory storage medium according to claim 21, said method further comprising sending one of map data and point of interest data from said wireless communication device to said in-vehicle navigational device.

26. A wireless communication device comprising:
a display;
an input interface for receiving user inputs;
a GPS receiver for receiving location information of said wireless communication device, said location information indicating a location of said wireless communication device;
a memory; and
a processor, said processor being programmed to perform instructions comprising:
receiving destination information, said destination information indicating a location of a destination;
generating navigation information for traveling between said location of said wireless communication device and said location of said destination;
sending, from said wireless communication device, a request for navigational information, said navigational information including route information for traveling between said location of said wireless communication device and said location of said destination, wherein said request for navigation is sent over to a server over a telecommunication network,
wherein the server queries a remote party of position request for permission on whether the position request can be granted based on criteria; and
wherein said navigational information causes an in-vehicle navigational device to display on said display device of said in-vehicle navigational device driving directions for traveling between said location of said wireless communication device and said location of said destination.

27. The wireless communication device according to claim 26, wherein said communication with said in-vehicle navigational device is established via a wireless connection.

28. The wireless communication device according to claim 27, wherein said wireless connection is one of a IEEE 802.11b connection and an infrared connection.

29. The wireless communication device according to claim 26, wherein said wireless communication device is a cellular phone.

30. The wireless communication device according to claim 26, wherein said processor is programmed to further perform sending to said in-vehicle navigational device one of map data and point of interest data.

31. An in-vehicle navigational device comprising:
a display device;
an input interface for receiving user inputs;
a position determining system;
an interface for interfacing with a wireless communication device, said wireless communication device including a display and a GPS receiver for receiving location information of said wireless communication device, said location information indicating a location of said wireless communication device;
a processor, said processor being programmed to perform instructions comprising:
receiving, by said in-vehicle navigational device from said wireless communication device, said location information generated with said wireless communication device;
receiving destination information via said input interface, said destination information indicating a location of a destination;
sending, from said wireless communication device, a request for navigational information, said navigational information including route information for traveling between said location of said wireless communication device and said location of said destination, wherein said request for navigation is sent over to a server over a telecommunication network,
wherein the server queries a remote party of position request for permission on whether the position request can be granted based on criteria;
generating, with an in-vehicle navigational device, navigation information for traveling between said location of said wireless communication device and said location of said destination, said navigation information being generated based on said location information of said wireless communication device and said destination information received from said wireless communication device; and
displaying on said in-vehicle navigational device driving directions for traveling between said location of said wireless communication device and said location of said destination.

32. The vehicular navigation device according to claim 31, wherein said interface is a wireless interface.

33. The vehicular navigation device according to claim 32, wherein said wireless interface is one of an IEEE 802.11b connection and an infrared connection.

34. The vehicular navigation device according to claim 31, wherein said wireless communication device is a cellular phone.

35. The vehicular navigation device according to claim 31, wherein said input interface is a touch-sensitive display overlay.

36. An automobile having an in-vehicle navigational device, comprising:
a display device;
an input interface for receiving user inputs;
a positioning determining system;
an interface for interfacing with a wireless communication device, said wireless communication device including a display and a GPS receiver for receiving location information of said wireless communication device, said location information indicating a location of said wireless communication device;
a processor to perform instructions comprising:
receiving, at said in-vehicle navigational device from said wireless communication device, location information generated with said wireless communication device;
receiving destination information via said input interface, said destination information indicating a location of a destination;
sending, from said wireless communication device, a request for navigational information, said navigational information including route information for traveling between said location of said wireless communication device and said location of said destination, wherein said request for navigation is sent over to a server over a telecommunication network,
wherein the server queries a remote party of position request for permission on whether the position request can be granted based on criteria;
generating, with an in-vehicle navigational device, navigation information for traveling between said location of said wireless communication device and said location of said destination, said navigation information being generated based on said location information of said wireless communication device and said destination information received from said wireless communication device; and displaying on said in-vehicle navigational device driving directions for traveling between said location of said wireless communication device and said location of said destination.

37. The automobile according to claim 36, wherein said interface is a wireless interface.

38. The automobile according to claim 37, wherein said wireless interface is one of a IEEE 802.11b connection and an infrared connection.

39. The automobile according to claim 35, wherein said wireless communication device is a cellular phone.

40. The automobile according to claim 36, wherein said input interface is a touch-sensitive display overlay.

41. An automobile having a computing device, said computing device comprising:
a display device;
an input interface for receiving user inputs;
a position determining system;
an interface for interfacing with a wireless communication, device, said wireless communication device including a display and a GPS receiver for receiving location information of said wireless communication device;
a processor to perform instructions comprising:
receiving, at an in-vehicle navigational device from said wireless communication device, navigational information generated with said wireless communication device for traveling between an origin and a destination;
sending, from said wireless communication device, a request for navigational information, said navigational information including route information for traveling between said location of said wireless communication device and said location of said destination, wherein said request for navigation is sent over to a server over a telecommunication network,
wherein the server queries a remote party of position request for permission on whether the position request can be granted based on criteria;
generating graphical data for displaying on said display device driving directions for traveling between said origin and said destination based on said navigation information received from said wireless communication device; and
displaying, on a display device of said in-vehicle navigational device, driving directions for traveling between said origin and said destination.

42. The automobile according to claim 41, wherein said interface is a wireless interface.

43. The automobile according to claim 42, wherein said wireless interface is one of a IEEE 802.11b connection and an infrared connection.

44. The automobile according to claim 41, wherein said wireless communication device is a cellular phone.

45. The automobile according to claim 41, wherein said user interface is a touch-sensitive display overlay.

* * * * *